(No Model.)

J. G. MOOMY.
BELT PULLEY.

No. 391,180. Patented Oct. 16, 1888.

Witnesses
S. D. Dobbins
R. F. Gaggin

Inventor.
Jos. G. Moomy.
By his Attorneys
Hallock & Hallock

United States Patent Office.

JOSEPH G. MOOMY, OF ERIE, PENNSYLVANIA, ASSIGNOR TO THE TAPER SLEEVE PULLEY WORKS, OF SAME PLACE.

BELT-PULLEY.

SPECIFICATION forming part of Letters Patent No. 391,180, dated October 16, 1888.

Application filed June 22, 1888. Serial No. 277,886. (No model.)

*To all whom it may concern:*

Be it known that I, JOSEPH G. MOOMY, a citizen of the United States, residing at Erie, in the county of Erie and State of Pennsylvania, have invented certain new and useful Improvements in Belt-Pulleys; and I do hereby declare the following to be a full, clear, and exact description of the invention, such as will enable others skilled in the art to which it appertains to make and use the same.

This invention relates to belt-pulleys; and it consists in certain improvements in the means for fastening the same upon the shaft.

My device is applicable to either separable or non-separable pulleys; but it is intended for use chiefly on separable pulleys, and I have illustrated it in the accompanying drawings as applied to such a pulley.

Figure 1:
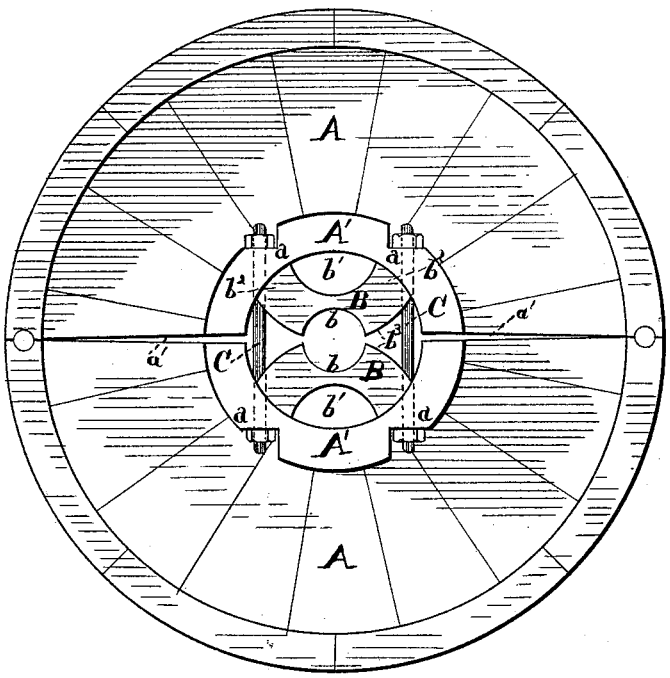
Figure 2:
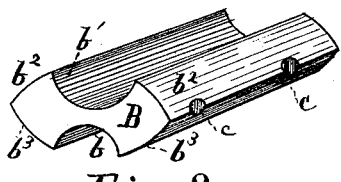
Figure 3:
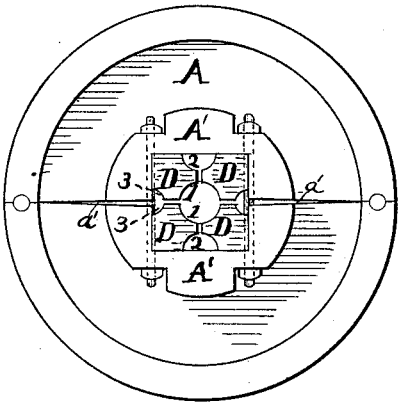

The accompanying drawings illustrate my invention, as follows:

Figure 1 is a side elevation of a wooden separable pulley having my invention thereon. Fig. 2 is a perspective view of one of the parts B shown in Fig. 1. Fig. 3 is a view like Fig. 1, showing an alternative construction.

A A are the two halves of the separable pulley.

A' A' are flanges on the two halves A, which form the hub of the pulley when the two parts are put together.

$a$ $a$ $a$ $a$ are insets in the hub, which form seats for the heads and nuts of the binding-bolts C.

$a'$ $a'$ mark a gore-shaped space between the parts of the pulley, the web of each part being slightly cut away toward the center, so as to have the two parts seated upon each other at the rim only. The object of this is to insure a perfect seating at the rim in all cases. The gore-shaped space may be very narrow, the drawings, in fact, showing it more pronounced than it need be in actual use. The hole through the hub is much larger than the shaft, and bushing-pieces B are used to fill the extra space. These bushing-pieces constitute the essential feature of my invention. Fig. 2 shows one of them detached from the pulley. Each piece B has two faces, $b$ and $b'$, which may bear on the shaft, and four faces, $b^2$ $b^2$ and $b^3$ $b^3$, which may bear on the wall of the opening through the hub.

In Fig. 1 the bushing-pieces B are so arranged that the shaft-bearing faces $b$ $b$ are in place to receive the shaft and the hub-bearing faces $b^2$ $b^2$ are in position to bear upon the wall of the hub opening. Now it will be seen that these pieces B may be removed and turned over and put in again. When this is done, the shaft-bearing faces $b'$ $b'$ will be toward the center and the hub-bearing faces $b^3$ $b^3$ will be next to the wall of the hub-opening. It will also be observed that the circular faces $b$ $b$ and $b'$ $b'$ are formed on different length radii, so that when the bushing-pieces B are arranged in one way the pulley will receive one-sized shaft and when arranged the other way the pulley will receive a larger shaft. The bushing-pieces B have notches $c$, as shown in Fig. 2, so as to allow the bolts C to pass through the hub, as seen in Fig. 1, and when the bolts are in place the bushing-pieces B cannot drop out. The bushing-pieces are therefore reversible and adapted to accommodate two different sizes of shafting.

In Fig. 3 a modification is shown. Here the opening through the hub of the pulley is square, and there are four bushing-pieces D, each of which has three curved faces, 1, 2, and 3, and they might have four, if desired. These bushing-pieces are removable the same as the ones shown in Figs. 1 and 2, and they are reversible, and by changing them properly, as can easily be seen, they will accommodate three different sizes of shafting.

The bolts C clamp the two parts of the pulley together and bind the bushings upon the shaft.

What I claim as new is—

1. In a belt-pulley, the combination of a hub having a central opening larger than the shaft and two or more removable and reversible bushing-pieces fitting in said opening, each of which pieces is provided with two or more shaft-bearing faces of different radii, substantially as and for the purposes set forth.

2. In a separable belt-pulley, the combination of a hub formed by the flanges A', which hub has a central opening larger than the shaft, and said flanges having bolt-seats $a$, bolts C, passing through said flanges at right angles to the line of separation of the two parts of the pulley, and two or more reversible bushing-pieces having two or more shaft-bearing faces removably adjusted in said central opening.

In testimony whereof I affix my signature in presence of two witnesses.

JOSEPH G. MOOMY.

Witnesses:
 JNO. K. HALLOCK,
 M. DEWALL.